(12) United States Patent
Zhu et al.

(10) Patent No.: US 11,109,261 B2
(45) Date of Patent: Aug. 31, 2021

(54) ANTENNA PORT MAPPING METHOD AND NETWORK DEVICE

(71) Applicant: HUAWEI TECHNOLOGIES CO., LTD., Guangdong (CN)

(72) Inventors: Xiaolong Zhu, Shanghai (CN); Jia Lv, Shanghai (CN); Dongdong Ruan, Shanghai (CN); Shuo Jin, Shenzhen (CN); Gang Cao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 92 days.

(21) Appl. No.: 16/698,690

(22) Filed: Nov. 27, 2019

(65) Prior Publication Data

US 2020/0100135 A1 Mar. 26, 2020

Related U.S. Application Data

(63) Continuation of application No. PCT/CN2018/089258, filed on May 31, 2018.

(30) Foreign Application Priority Data

May 31, 2017 (CN) .......................... 201710400833.0

(51) Int. Cl.
*H04W 28/02* (2009.01)
*H04B 17/327* (2015.01)
(Continued)

(52) U.S. Cl.
CPC ...... *H04W 28/0263* (2013.01); *H04B 7/0404* (2013.01); *H04B 17/327* (2015.01);
(Continued)

(58) Field of Classification Search
CPC .... H04B 17/12; H04B 17/327; H04B 17/336; H04B 7/0404; H04B 7/068; H04B 7/10;
(Continued)

(56) References Cited

U.S. PATENT DOCUMENTS

| 2010/0120415 | A1* | 5/2010 | Urquhart | ............. H04B 17/318 |
| | | | | 455/424 |
| 2010/0246712 | A1* | 9/2010 | Suo | ....................... H04L 5/0048 |
| | | | | 375/295 |

(Continued)

FOREIGN PATENT DOCUMENTS

| CN | 101777945 A | 7/2010 |
| CN | 103378890 A | 10/2013 |

(Continued)

*Primary Examiner* — Minh Trang T Nguyen
(74) *Attorney, Agent, or Firm* — Womble Bond Dickinson (US) LLP

(57) ABSTRACT

An antenna port mapping method and a network device are disclosed. The method includes: determining, by a network device, a polarization direction of each of P physical antennas of the network device and an antenna array to which each of the P physical antennas belongs, where P is a multiple of 4; and respectively mapping, by the network device, a first antenna port and a second antenna port to a first group of physical antennas and a second group of physical antennas in the P physical antennas, and respectively mapping a third antenna port and a fourth antenna port to a third group of physical antennas and a fourth group of physical antennas in the P physical antennas.

20 Claims, 3 Drawing Sheets

A network device determines a polarization direction of each of P physical antennas of the network device and an antenna array to which each of the P physical antennas belongs, where P is a multiple of 4 — 301

The network device respectively maps a first antenna port and a second antenna port to a first group of physical antennas and a second group of physical antennas in the P physical antennas, and respectively maps a third antenna port and a fourth antenna port to a third group of physical antennas and a fourth group of physical antennas in the P physical antennas — 302

(51) Int. Cl.
 *H04B 17/336* (2015.01)
 *H04B 7/0404* (2017.01)
 *H04L 1/06* (2006.01)
 *H04L 5/00* (2006.01)

(52) U.S. Cl.
 CPC ......... *H04B 17/336* (2015.01); *H04L 1/0625* (2013.01); *H04L 5/0048* (2013.01)

(58) Field of Classification Search
 CPC ....... H04L 1/06; H04L 1/0625; H04L 5/0048; H04W 28/0263
 See application file for complete search history.

(56) References Cited

U.S. PATENT DOCUMENTS

2012/0087450 A1 4/2012 Coldrey et al.
2016/0337017 A1 11/2016 Moon et al.

FOREIGN PATENT DOCUMENTS

| EP | 3528342 A1 | 8/2019 |
| JP | 2012508537 A | 4/2012 |
| WO | 2014198068 A1 | 12/2014 |

\* cited by examiner

```
┌─────────────────────────────────────────────────────────────┐
│   A network device determines a polarization direction of each of P   │ ⌒── 301
│  physical antennas of the network device and an antenna array to which │
│   each of the P physical antennas belongs, where P is a multiple of 4  │
└─────────────────────────────────────────────────────────────┘
                                │
                                ▼
┌─────────────────────────────────────────────────────────────┐
│     The network device respectively maps a first antenna port and a    │
│  second antenna port to a first group of physical antennas and a second │ ⌒── 302
│   group of physical antennas in the P physical antennas, and respectively│
│    maps a third antenna port and a fourth antenna port to a third group of │
│       physical antennas and a fourth group of physical antennas in the P    │
│                          physical antennas                           │
└─────────────────────────────────────────────────────────────┘
```

FIG. 3

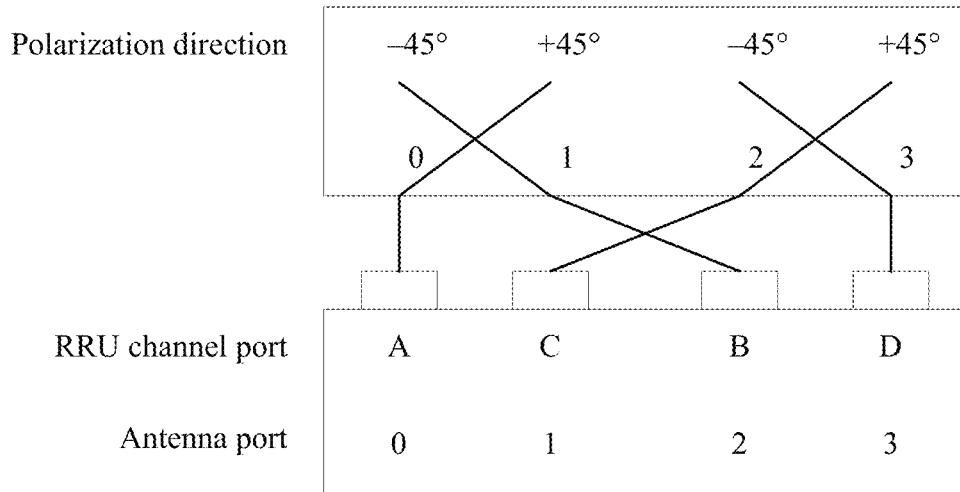

FIG. 4

ANTENNA PORT MAPPING METHOD AND NETWORK DEVICE

CROSS-REFERENCE TO RELATED APPLICATIONS

This application is a continuation of International Application No. PCT/CN2018/089258, filed on May 31, 2018, which claims priority to Chinese Patent Application No. 201710400833.0, filed on May 31, 2017. The disclosures of the aforementioned applications are hereby incorporated by reference in their entireties.

TECHNICAL FIELD

This application relates to the field of communications technologies, and in particular, to an antenna port mapping method and a network device.

BACKGROUND

In a long term evolution (LTE) system, a maximum of four cell-level antenna ports are defined, and a combination solution of a space frequency block code (SFBC) and a frequency switched transmit diversity (FSTD) is used as a transmit diversity solution of four antenna ports. An antenna port 0 and an antenna port 2 form a group of SFBC codes, and an antenna port 1 and an antenna port 3 form another group of SFBC codes. In a scenario in which dual-polarized antennas are used, to obtain a larger diversity gain, it is required that physical antennas connected to the antenna port 0 and the antenna port 2 are in different polarization directions, and physical antennas connected to the antenna port 1 and the antenna port 3 are in different polarization directions.

Currently, when an antenna port of a cell-specific reference signal (CRS) is mapped, a sequence of connections between RRU channel ports and physical antennas needs to be known, and then according to an optimal diversity gain criterion, the antenna port 0 and the antenna port 2 can be mapped to physical antennas in different polarization directions, and the antenna port 1 and the antenna port 3 can be mapped to physical antennas in different polarization directions. For example, if RRU channel ports of a radio remote unit (RRU) are displayed in a sequence of A, C, D, and B, and polarization directions of physical antennas connected to the RRU channel ports are respectively +45°, −45°, +45°, and −45°, to obtain a larger diversity gain, four antenna ports of the CRS are mapped to the RRU channel ports in a sequence of a port 0, port 2, port 1, and port 3, so as to respectively map the port 0, the port 2, the port 1, and the port 3 to the physical antennas in the polarization directions of +45°, −45°, +45°, and −45°.

Because sequences of connections between RRU channel ports and physical antennas are different in devices produced by manufacturers, an engineer needs to map an antenna port based on devices produced by different manufacturers, and consequently operations are relatively cumbersome. Furthermore, if an error occurs in a connection between an RRU channel port and a physical antenna, an optimal diversity gain cannot be obtained after an antenna port is mapped to the physical port. Therefore, how to quickly and accurately map an antenna port to a physical antenna is a problem to be urgently resolved.

SUMMARY

This application provides an antenna port mapping method and a network device, to resolve a problem of how to quickly and accurately map an antenna port to a physical antenna.

According to a first aspect, an embodiment of this application provides an antenna port mapping method, and the method includes the following:

A network device determines a polarization direction of each of P physical antennas of the network device and an antenna array to which each of the P physical antennas belongs, where P is a multiple of 4. Subsequently, the network device may respectively map a first antenna port and a second antenna port to a first group of physical antennas and a second group of physical antennas in the P physical antennas, and respectively map a third antenna port and a fourth antenna port to a third group of physical antennas and a fourth group of physical antennas in the P physical antennas. Any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

According to the method provided in this embodiment of this application, the network device determines the polarization direction of each of the P physical antennas and the antenna array to which each of the P physical antennas belongs, so as to map the first antenna port to the fourth antenna port to the P physical antennas in an optimal manner, thereby efficiently and accurately mapping the antenna port, and increasing a gain of a signal sent by using the antenna port.

In one embodiment, the P physical antennas include P/2 antenna arrays, and each antenna array includes two physical antennas; and the network device may determine the antenna array to which each of the P physical antennas belongs by using the following method:

The network device obtains P×(P−1) groups of signal quality measurement values, and the P×(P−1) groups of signal quality measurement values are obtained by the network device by keeping a downtilt angle of one of the P/2 antenna arrays unchanged while adjusting a downtilt angle of the other P/2−1 antenna array N times. Any group of the P×(P−1) groups of signal quality measurement values includes N signal quality measurement values, and the group of signal quality measurement values is determined by one of the P physical antennas based on received N signals sent by another physical antenna in the P physical antennas, where N is a positive integer greater than 1.

The network device determines a variance of each group of the P×(P−1) groups of signal quality measurement values, and determines that two physical antennas corresponding to a group of signal quality measurement values with a smallest or second smallest variance in the P×(P−1) groups of signal quality measurement values belong to a same antenna array.

The network device determines whether P−2 is greater than 2. If P−2 is greater than 2, the network device subtracts 2 from P and returns to the operation in which the network device obtains the P×(P−1) groups of signal quality measurement values; or if P−2 is not greater than 2, when an antenna array to which two physical antennas in the P physical antennas belong is not determined, the network device determines that the two physical antennas belong to a same antenna array.

According to the method, the network device obtains the P×(P−1) groups of signal quality measurement values by keeping the downtilt angle of one of the P/2 antenna arrays unchanged while adjusting the downtilt angle of the other P/2−1 antenna array N times, and therefore may determine the variance of each group of the P×(P−1) groups of signal quality measurement values. When two physical antennas belong to a same antenna array and a downtilt angle of the antenna array keeps unchanged, a channel between the two physical antennas does not change significantly. Therefore, a variance of signal quality measurement values mutually measured by the two physical antennas is smallest, so that physical antennas belonging to a same antenna array in the P physical antennas may be accurately and effectively determined by using the variance of signal quality measurement values.

In one embodiment, P is 4, the P physical antennas are divided into two antenna arrays, and each antenna array includes two physical antennas; and that the network device determines the antenna array to which each of the P physical antennas of the network device belongs includes the following:

The network device obtains K groups of signal quality measurement values, where K is 11 or 12, and the K groups of signal quality measurement values are obtained by the network device by keeping a downtilt angle of one of the two antenna arrays unchanged while adjusting a downtilt angle of the other antenna array N times. Any group of the K groups of signal quality measurement values includes N signal quality measurement values, and the group of signal quality measurement values is determined by one of the P physical antennas based on received N signals sent by another physical antenna in the P physical antennas, where N is a positive integer greater than 1.

The network device determines a variance of each group of the K groups of signal quality measurement values, and determines that two physical antennas corresponding to a group of signal quality measurement values with a smallest variance in the K groups of signal quality measurement values belong to a same antenna array, and that the other two physical antennas in the P physical antennas belong to a same antenna array.

In one embodiment, P is 4, the P physical antennas are divided into two antenna arrays, and each antenna array includes two physical antennas; and that the network device determines the antenna array to which each of the P physical antennas of the network device belongs includes the following:

The network device obtains K groups of signal quality measurement values, where K is 12, and the K groups of signal quality measurement values are obtained by the network device by keeping a downtilt angle of one of the two antenna arrays unchanged while adjusting a downtilt angle of the other antenna array N times. Any group of the K groups of signal quality measurement values includes N signal quality measurement values, and the group of signal quality measurement values is determined by one of the P physical antennas based on received N signals sent by another physical antenna in the P physical antennas, where N is a positive integer greater than 1.

The network device determines a variance of each group of the K groups of signal quality measurement values, and determines that two physical antennas corresponding to a group of signal quality measurement values with a smallest or second smallest variance in the K groups of signal quality measurement values belong to a same antenna array, and that the other two physical antennas in the P physical antennas belong to a same antenna array.

In one embodiment, the signal quality measurement value is a signal to interference plus noise ratio SINR or reference signal received power RSRP.

Because a calculation of the SINR or the RSRP is convenient and easy to implement, when the signal quality measurement value is the SINR or the RSRP, the antenna array to which each physical antenna belongs may be more effectively determined.

In one embodiment, P is 4; and
that the network device determines the polarization direction of each of the P physical antennas of the network device includes the following:

The network device receives M uplink signals by using the P physical antennas, and determines P groups of signal receiving measurement values, where any group of the P groups of signal receiving measurement values includes M signal receiving measurement values of the M uplink signals received by one of the P physical antennas, and M is a positive integer greater than 1.

The network device determines a coefficient of a correlation between every two groups of the P groups of signal receiving measurement values, determines two physical antennas, as physical antennas in a first polarization direction, corresponding to two groups of signal receiving measurement values corresponding to a largest correlation coefficient, and determines the other two physical antennas in the P physical antennas as physical antennas in a second polarization direction.

According to the method, physical antennas in a same direction or in close directions have a relatively high channel correlation, and signal receiving measurement values of signals received by using the physical antennas have a relatively high correlation. Therefore, physical antennas in a same polarization direction may be accurately determined based on a coefficient of a correlation between every two groups of signal receiving measurement values.

In one embodiment, the uplink signal is a demodulation reference signal DMRS or a sounding reference signal SRS.

An embodiment of this application provides a network device, including a processor and a memory, where the memory stores an executable instruction, and the processor reads the executable instruction in the memory to perform the following operations:

determining a polarization direction of each of P physical antennas of the network device and an antenna array to which each of the P physical antennas belongs, where P is a multiple of 4; and respectively mapping a first antenna port and a second antenna port to a first group of physical antennas and a second group of physical antennas in the P physical antennas, and respectively mapping a third antenna port and a fourth antenna port to a third group of physical antennas and a fourth group of physical antennas in the P physical antennas, where any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

In one embodiment, P is 4, the P physical antennas are divided into two antenna arrays, and each antenna array includes two physical antennas; and the processor is specifically configured to: obtain K groups of signal quality measurement values, where K is 11 or 12; the K groups of signal quality measurement values are obtained by the network device by keeping a downtilt angle of one of the two antenna arrays unchanged while adjusting a downtilt angle of the other antenna array N times; and any group of the K groups of signal quality measurement values includes N signal quality measurement values, where the group of signal quality measurement values is determined by one of the P physical antennas based on received N signals sent by another physical antenna in the P physical antennas, and N is a positive integer greater than 1; and determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

In one embodiment, the signal quality measurement value is a signal to interference plus noise ratio SINR or reference signal received power RSRP.

In one embodiment, P is 4; and the processor is specifically configured to:

receive M uplink signals by using the P physical antennas, and determine P groups of signal receiving measurement values, where any group of the P groups of signal receiving measurement values includes M signal receiving measurement values of the M uplink signals received by one of the P physical antennas, and M is a positive integer greater than 1; and determine a coefficient of a correlation between every two groups of the P groups of signal receiving measurement values, determine two physical antennas, as physical antennas in a first polarization direction, corresponding to two groups of signal receiving measurement values corresponding to a largest correlation coefficient, and determine the other two physical antennas in the P physical antennas as physical antennas in a second polarization direction.

In one embodiment, the uplink signal is a demodulation reference signal DMRS or a sounding reference signal SRS.

An embodiment of this application provides a network device, including:

a processing unit, configured to determine a polarization direction of each of P physical antennas of the network device and an antenna array to which each of the P physical antennas belongs, where P is a multiple of 4; and a mapping unit, configured to: respectively map a first antenna port and a second antenna port to a first group of physical antennas and a second group of physical antennas in the P physical antennas, and respectively map a third antenna port and a fourth antenna port to a third group of physical antennas and a fourth group of physical antennas in the P physical antennas, where any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

In one embodiment, P is 4, the P physical antennas are divided into two antenna arrays, and each antenna array includes two physical antennas; and the processing unit is specifically configured to:

obtain K groups of signal quality measurement values, where K is 11 or 12; the K groups of signal quality measurement values are obtained by the network device by keeping a downtilt angle of one of the two antenna arrays unchanged while adjusting a downtilt angle of the other antenna array N times; and any group of the K groups of signal quality measurement values includes N signal quality measurement values, where the group of signal quality measurement values is determined by one of the P physical antennas based on received N signals sent by another physical antenna in the P physical antennas, and N is a positive integer greater than 1; and determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

In one embodiment, the signal quality measurement value is a signal to interference plus noise ratio SINR or reference signal received power RSRP.

In one embodiment, P is 4; and the processing unit is specifically configured to:

receive M uplink signals by using the P physical antennas, and determine P groups of signal receiving measurement values, where any group of the P groups of signal receiving measurement values includes M signal receiving measurement values of the M uplink signals received by one of the P physical antennas, and M is a positive integer greater than 1; and determine a coefficient of a correlation between every two groups of the P groups of signal receiving measurement values, determine two physical antennas, as physical antennas in a first polarization direction, corresponding to two groups of signal receiving measurement values corresponding to a largest correlation coefficient, and determine the other two physical antennas in the P physical antennas as physical antennas in a second polarization direction.

In one embodiment, the uplink signal is a demodulation reference signal DMRS or a sounding reference signal SRS.

An embodiment of this application further provides a computer storage medium. The storage medium stores a software program, and when the software program is read and executed by one or more processors, the antenna port mapping method provided in any of the foregoing designs may be implemented.

An embodiment of this application further provides a system, and the system includes the network device provided in any of the foregoing designs. In one embodiment, the system may further include another device interacting with the network device in the solution provided in the embodiments of this application.

An embodiment of this application further provides a computer program product including an instruction. When the computer program product runs on a computer, the computer performs the antenna port mapping method in each of the foregoing aspects.

BRIEF DESCRIPTION OF DRAWINGS

FIG. 3 is a schematic flowchart of an antenna port mapping method according to an embodiment of this application;

FIG. 4 is a schematic mapping diagram of an antenna port according to an embodiment of this application;

DESCRIPTION OF EMBODIMENTS

The following further describes in detail this application with reference to accompanying drawings.

The embodiments of this application may be applied to various mobile communications systems, such as a global system for mobile communications (GSM), a code division multiple access (CDMA) system, a wideband code division multiple access (WCDMA), a general packet radio service (GPRS), a long term evolution (LTE) system, an advanced long term evolution (LTE-A) system, a universal mobile telecommunications system (UMTS), an evolved long term evolution (eLTE) system, a 5G (for example, a new radio (NR) system), and other mobile communications systems.

In addition, it should be noted that in the embodiments of this application, a terminal is also referred to as user equipment (a terminal), and is a device that provides a user with voice and/or data connectivity, for example, a handheld device or an in-vehicle device that has a wireless connection function. For example, common terminals include a mobile phone, a tablet computer, a notebook computer, a palmtop computer, a mobile internet device (MID), and a wearable device, such as a smartwatch, a smart band, or a pedometer.

In the embodiments of this application, a network device maybe a common base station (for example, a NodeB or an eNB), a new radio controller (NR controller), a gNodeB (gNB) in a 5G system, a centralized network element (Centralized Unit), a new wireless base station, a remote radio unit, a micro base station, a relay, a distributed network element, a transmission reception point (TRP) or a transmission point (TP), or any other wireless access device. However, the embodiments of this application are not limited thereto.

Figure 1:
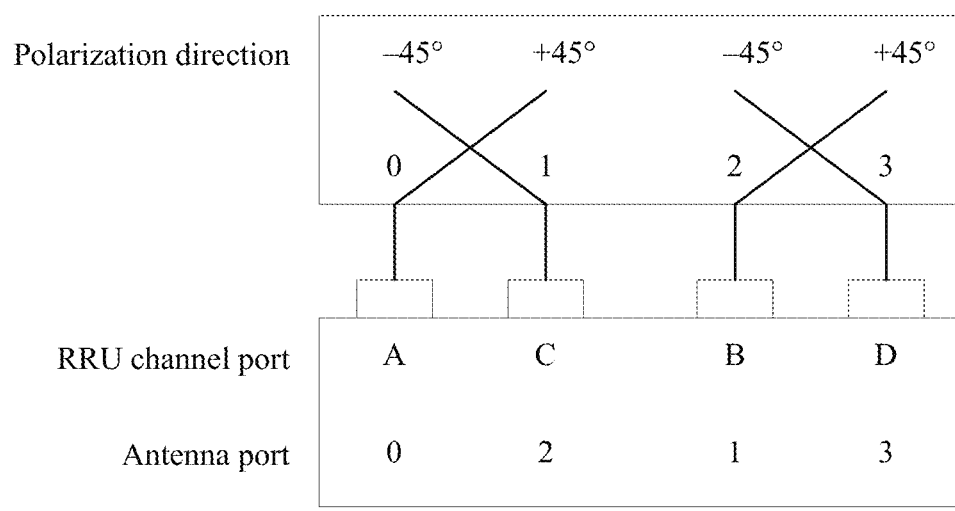
FIG. 1 is a schematic mapping diagram of an antenna port in the prior art.

Currently, the network device may support four, eight, or more physical antennas. That the network device supports four physical antennas is used as an example for description below. When the network device supports four physical antennas, if the network device sends signals by using four antenna ports, a combination solution of an SFBC and an FSTD may be used as a transmit diversity solution of the four antenna ports. In this case, in the four antenna ports, an antenna port 0 and an antenna port 2 form a group of SFBC codes, and an antenna port 1 and an antenna port 3 form another group of SFBC codes. In addition, a physical antenna, an RRU channel port, and an antenna port are mapped according to an optimal diversity gain criterion. For example, FIG. 1 is a schematic mapping diagram of an antenna port in the prior art. In FIG. 1, a physical antenna 0, a physical antenna 1, a physical antenna 2, and a physical antenna 3 are respectively connected to RRU channel ports A, C, D, and B. Polarization directions of the physical antenna 0, the physical antenna 1, the physical antenna 2, and the physical antenna 3 are respectively +45°, −45°, +45°, and −45°, the physical antenna 0 and the physical antenna 1 belong to a same antenna array, and the physical antenna 2 and the physical antenna 3 belong to a same antenna array. According to the optimal diversity gain criterion, when the network device configures the antenna ports, a configuration sequence is the antenna port 0, the antenna port 2, the antenna port 1, and the antenna port 3, that is, the antenna port 0, the antenna port 2, the antenna port 1, and the antenna port 3 are respectively mapped to the RRU channel ports A, C, D, and B. After a physical antenna and an RRU channel port are connected, if the physical antenna and the RRU channel port need to be reconnected, an engineer needs to go to a base station in person, and disassembles an RRU to reconnect the physical antenna and the RRU channel port. This is extremely complex to implement and has low efficiency. Therefore, if a physical antenna and an RRU channel port are not connected in a way specified in advance, an antenna port cannot be mapped to the physical antenna according to the optimal diversity gain criterion, and consequently a high gain cannot be obtained.

Figure 2:
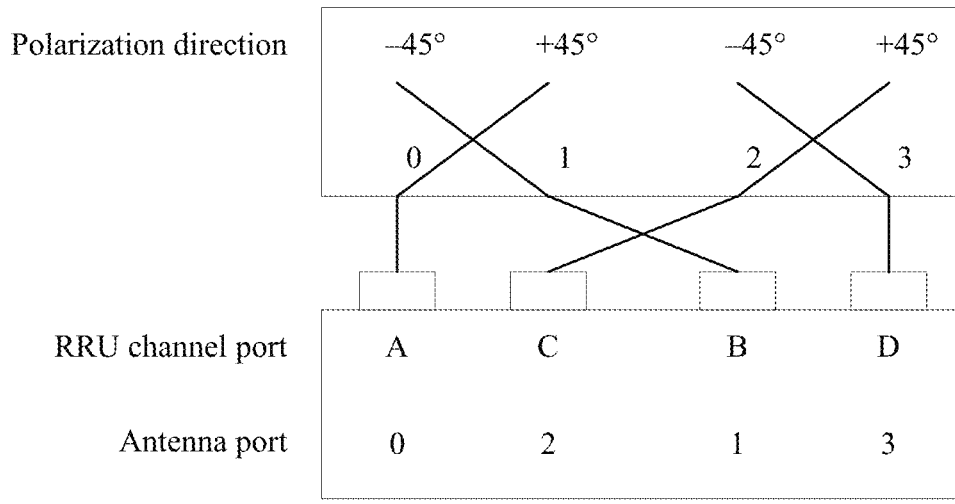
FIG. 2 is a schematic mapping diagram of an antenna port according to an embodiment of this application.

For example, with reference to FIG. 1, FIG. 2 is a schematic mapping diagram of an antenna port according to an embodiment of this application. In FIG. 2, an error occurs in a connection between a physical antenna and an RRU channel port. As a result, the RRU channel port B is connected to the physical antenna 1, and the RRU channel port C is connected to the physical antenna 2. If in this case, the antenna port 0, the antenna port 2, the antenna port 1, and the antenna port 3 are mapped to the RRU channel ports A, C, D, and B in an original sequence (that is, the sequence in FIG. 2), an antenna port cannot be mapped to the physical antenna in an optimal manner, and consequently a gain of a transmitted signal decreases.

To resolve this, the embodiments of this application provide an antenna port mapping method, to efficiently and accurately map an antenna port to a physical antenna.

With reference to the above descriptions, FIG. 3 is a schematic flowchart of an antenna port mapping method according to an embodiment of this application. The method includes the following operations:

Operation 301: A network device determines a polarization direction of each of P physical antennas of the network device and an antenna array to which each of the P physical antennas belongs, where P is a multiple of 4.

Operation 302: The network device respectively maps a first antenna port and a second antenna port to a first group of physical antennas and a second group of physical antennas in the P physical antennas, and respectively maps a third antenna port and a fourth antenna port to a third group of physical antennas and a fourth group of physical antennas in the P physical antennas.

Any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

In operation 301, every two antennas in the P physical antennas of the network device belong to a same antenna array, and physical antennas belonging to a same antenna array are in different polarization directions. For example, the network device may support four physical antennas, which are respectively a physical antenna 0, a physical antenna 1, a physical antenna 2, and a physical antenna 3. The physical antenna 0 and the physical antenna 1 belong to a same antenna array and are respectively in polarization directions of +45° and −45°, and the physical antenna 2 and the physical antenna 3 belong to a same antenna array and are respectively in polarization directions of +45° and −45°.

With reference to the above descriptions, the P physical antennas include P/2 antenna arrays, and each antenna array includes two physical antennas.

The network device may determine the antenna array to which each of the P physical antennas belongs by using the following method:

Operation 1: The network device obtains K groups of signal quality measurement values, where K is P×(P−1) or P×(P−1)−1, and the K groups of signal quality measurement values are obtained by the network device by keeping a downtilt angle of one of the P/2 antenna arrays unchanged while adjusting a downtilt angle of the other P/2−1 antenna array N times. Any group of the K groups of signal quality measurement values includes N signal quality measurement values, and the group of signal quality measurement values is determined by one of the P physical antennas based on received N signals sent by another physical antenna in the P physical antennas, where N is a positive integer greater than 1.

In this embodiment of this application, the signal quality measurement value may be a signal to interference plus noise ratio (SINR) or reference signal received power (RSRP), or certainly may be another type of value. Details are not described herein.

Operation 2: The network device determines a variance of each group of the K groups of signal quality measurement values, and determines that two physical antennas corresponding to a group of signal quality measurement values with a smallest variance in the K groups of signal quality measurement values belong to a same antenna array.

It should be noted that when K is P×(P−1), the network device may determine that two physical antennas corresponding to a group of signal quality measurement values with a smallest or second smallest variance in the K groups of signal quality measurement values belong to a same antenna array.

It should be noted that if two physical antennas, namely, a TX1 and a TX2, belong to a same antenna array and a downtilt angle of the antenna array keeps unchanged, a channel between the two physical antennas does not change significantly. Therefore, signal quality measurement values mutually measured by the two physical antennas do not fluctuate sharply. To be specific, a variance of signal quality measurement values measured when the TX1 receives a calibration signal sent by the TX2, and a variance of signal quality measurement values measured when the TX2 receives a calibration signal sent by the TX1 are both relatively small and close to 0.

If two physical antennas, namely, a TX1 and a TX2, belong to a same antenna array and a downtilt angle of the antenna array changes constantly, though the two physical antennas are static relative to each other, a channel between the two physical antennas changes. Therefore, signal quality measurement values mutually measured by the two physical antennas fluctuate, causing a larger variance.

Operation 3: The network device determines whether P−2 is greater than 2; and if P−2 is greater than 2, the network device subtracts 2 from P and return to operation 1; or P−2 is not greater than 2, the network device proceeds to operation 4.

Operation 4: Finally, when an antenna array to which two physical antennas in the P physical antennas belong is not determined, the network device determines that the two physical antennas belong to a same antenna array.

For example, when P is 4, the network device may first obtain K groups of signal quality measurement values, and K is 11 or 12.

The K groups of signal quality measurement values are obtained by the network device by keeping a downtilt angle of one of the two antenna arrays unchanged while adjusting a downtilt angle of the other antenna array N times. Any group of the K groups of signal quality measurement values includes N signal quality measurement values, and the group of signal quality measurement values is determined by one of the P physical antennas based on received N signals sent by another physical antenna in the P physical antennas, where N is a positive integer greater than 1.

For example, P is 4, that is, the network device includes four physical antennas in total: a TX1, a TX2, a TX3, and a TX4. When the signal quality measurement value is an SINR, 12 groups of signal quality measurement values are obtained in the following manner:

A downtilt angle of an antenna array is kept unchanged while a downtilt angle of another antenna array is adjusted N=4 times. Each time a downtilt angle is adjusted, the following operations are performed:

Operation 1: The TX2, the TX3, and the TX4 are used to send calibration signals, and the TX1 is used to receive the calibration signals sent by using the TX2, the TX3, and the TX4. In this case, calculated SINRs are respectively SINRi12, SINRi13, and SINRi14, where $SINR_imn$ represents an SINR value obtained when a TXn sends a calibration signal and a TXm receives the calibration signal, and the obtained SINR value corresponds to an $i^{th}$ downtilt angle of an antenna array whose antenna downtilt angle is adjusted.

Operation 2: The TX1, the TX3, and the TX4 are used to send calibration signals, and the TX2 is used to receive the calibration signals sent by using the TX1, the TX3, and the TX4. In this case, calculated SINRs are respectively SINRi21, SINRi23, and SINRi24.

Operation 3: The TX1, the TX2, and the TX4 are used to send calibration signals, and the TX3 is used to receive the calibration signals sent by using the TX1, the TX2, and the TX4. In this case, calculated SINRs are respectively SINRi31, SINRi32, and SINRi34.

Operation 4: The TX1, the TX2, and the TX3 are used to send calibration signals, and the TX4 is used to receive the calibration signals sent by using the TX1, the TX2, and the TX3. In this case, calculated SINRs are respectively SINRi41, SINRi42, and SINRi43.

The finally obtained 12 groups of quality measurement values are shown in Table 1.

TABLE 1

| Downtilt Angle | SINR | | | | | |
|---|---|---|---|---|---|---|
| | First group | Second group | Third group | Fourth group | Fifth group | Sixth group |
| First downtilt angle | $SINR_112$ | $SINR_121$ | $SINR_113$ | $SINR_131$ | $SINR_114$ | $SINR_141$ |
| Second downtilt angle | $SINR_212$ | $SINR_221$ | $SINR_213$ | $SINR_231$ | $SINR_214$ | $SINR_241$ |
| Third downtilt angle | $SINR_312$ | $SINR_321$ | $SINR_313$ | $SINR_331$ | $SINR_314$ | $SINR_341$ |
| Fourth downtilt angle | $SINR_412$ | $SINR_421$ | $SINR_413$ | $SINR_431$ | $SINR_414$ | $SINR_441$ |

| Downtilt Angle | SINR | | | | | |
|---|---|---|---|---|---|---|
| | Seventh group | Eighth group | Ninth group | Tenth group | Eleventh group | Twelfth group |
| First downtilt angle | $SINR_123$ | $SINR_132$ | $SINR_124$ | $SINR_142$ | $SINR_134$ | $SINR_143$ |
| Second downtilt angle | $SINR_223$ | $SINR_232$ | $SINR_224$ | $SINR_242$ | $SINR_234$ | $SINR_243$ |
| Third downtilt angle | $SINR_323$ | $SINR_332$ | $SINR_324$ | $SINR_342$ | $SINR_334$ | $SINR_343$ |
| Fourth downtilt angle | $SINR_423$ | $SINR_432$ | $SINR_424$ | $SINR_442$ | $SINR_434$ | $SINR_443$ |

It should be noted that the calibration signal may be any signal. This is not limited in this embodiment of this application.

After determining the K groups of signal quality measurement values, the network device may determine the variance of each group of the K groups of signal quality measurement values, and determines that the two physical antennas corresponding to the group of signal quality measurement values with a smallest variance in the K groups of signal quality measurement values belong to a same antenna array, and that the other two physical antennas in the P physical antennas belong to a same antenna array.

It should be noted that when a value of K is 12, the network device may determine that two physical antennas corresponding to a group of signal quality measurement values with a smallest or second smallest variance in the K groups of signal quality measurement values belong to a same antenna array, and that the other two physical antennas in the P physical antennas belong to a same antenna array.

For example, P is 4. With reference to Table 1 and based on the method described above, the 12 groups of signal quality measurement values obtained by the network device may be shown in Table 2:

may determine that the TX1 and the TX2 belong to a same antenna array and the TX3 and the TX4 belong to a same antenna array. Certainly, because the TX1 and the TX2 belong to a same antenna array, a variance of signal quality measurement values measured when the TX1 receives a calibration signal sent by the TX2 is close to a variance of signal quality measurement values measured when the TX2 receives a calibration signal sent by the TX1. Therefore, the network device may also determine, based on a variance of the first group of signal quality measurement values, that the TX1 and the TX2 belong to a same antenna array and the TX3 and the TX4 belong to a same antenna array.

In this embodiment of this application, when P is 4, the network device may determine the polarization direction of each of the P physical antennas in the following manner:

Operation 1: The network device receives M uplink signals by using the P physical antennas, and allocates M signal receiving measurement values determined by using M uplink signals received by each antenna to one group, to obtain P groups of signal receiving measurement values. To be specific, any group of the P groups of signal receiving measurement values includes M signal receiving measure-

TABLE 2

| Downtilt Angle | SINR | | | | | |
|---|---|---|---|---|---|---|
| | First group | Second group | Third group | Fourth group | Fifth group | Sixth group |
| First downtilt angle | 38 | 39 | 34 | 24 | 13 | 41 |
| Second downtilt angle | 40 | 39 | 35 | 34 | 37 | 37 |
| Third downtilt angle | 39 | 39 | 30 | 30 | 31 | 33 |
| Fourth downtilt angle | 39 | 39 | 31 | 28 | 22 | 26 |
| Variance | 0.816497 | 0 | 2.380476 | 4.163332 | 10.5 | 6.396614 |

| Downtilt Angle | SINR | | | | | |
|---|---|---|---|---|---|---|
| | Seventh group | Eighth group | Ninth group | Tenth group | Eleventh group | Twelfth group |
| First downtilt angle | 13 | 38 | 36 | 40 | 10 | 13 |
| Second downtilt angle | 37 | 37 | 35 | 2 | 34 | 37 |
| Third downtilt angle | 30 | 30 | 26 | 30 | 30 | 30 |
| Fourth downtilt angle | 14 | 31 | 31 | 30 | 30 | 14 |
| Variance | 11.90238 | 4.082483 | 4.546061 | 16.36052 | 10.83205 | 11.12055 |

With reference to Table 2, the network device may determine that a variance of the second group of signal quality measurement values is the smallest, and therefore ment values of the M uplink signals received by one of the P physical antennas, and M is a positive integer greater than 1.

It should be noted that when the network device receives the M uplink signals by using the P physical antennas, all the physical antenna receives a same uplink signal, that is, each of the P physical antennas independently receives M uplink signals.

The M uplink signals may be sent by a terminal specified by the network device. This embodiment of this application imposes no limitation on how the network device specifies the terminal. For example, the network device may specify a terminal to send the uplink signals to the network device, where channel quality of a channel between the terminal and the network device meets a preset condition.

In this embodiment of this application, the signal receiving measurement value may be a signal receiving energy value when the network device receives the uplink signal, or a signal received power value when the network device receives the uplink signal. There are a plurality of methods in which the network device determines a signal receiving energy value of an uplink signal received by using a physical antenna. This is not limited in this embodiment of this application. For example, the network device may determine, according to Formula (1), a signal receiving energy value E of an uplink signal received by the network device by using any physical antenna:

$$E=|H \times S|^2 \qquad (1),\text{ where}$$

H is an estimation value of a channel between the physical antenna of the network device and a terminal sending uplink signal, and S is the uplink signal.

For a method for determining the signal receiving power value, refer to a method for calculating the RSRP. Details are not described herein again.

Certainly, the above is only an example. The network device may determine, in another manner, the signal receiving measurement value of the uplink signal received by using the physical antenna. Details are not described herein again.

Operation 2: The network device determines a coefficient of a correlation between every two groups of the P groups of signal receiving measurement values, determines two physical antennas, as physical antennas in a first polarization direction, corresponding to two groups of signal receiving measurement values corresponding to a largest correlation coefficient, and determines the other two physical antennas in the P physical antennas as physical antennas in a second polarization direction.

For example, when P is 4, the network device determines four groups of signal receiving measurement values, which are respectively E1, E2, E3 and E4. Then the network device respectively determines a coefficient of a correlation between E1 and E2, a coefficient of a correlation between E1 and E3, a coefficient of a correlation between E1 and E4, a coefficient of a correlation between E2 and E3, a coefficient of a correlation between E2 and E4, and a coefficient of a correlation between E3 and E4, and therefore determines six correlation coefficients. Subsequently, the network device determines two physical antennas, as physical antennas in the first polarization direction, corresponding to two groups of signal receiving measurement values corresponding to a largest correlation coefficient in the six correlation coefficients, and therefore may determine the other two physical antennas as physical antennas in the second polarization direction.

It should be noted that when P is another value, the polarization direction of each physical antenna may be determined with reference to the above method. Details are not described herein again. In addition, for a method for calculating the correlation coefficient, refer to descriptions in the prior art. Details are not described herein.

In one embodiment, the first polarization direction is 45°, and the second polarization direction is −45°; or the first polarization direction is −45°, and the second polarization direction is 45°. Certainly, the above is only an example, specific values of the first polarization direction and the second polarization direction may be determined according to an actual situation, and details are not described herein.

In one embodiment, the uplink signal may be a demodulation reference signal (DMRS) or a sounding reference signal (SRS).

In operation 302, the first antenna port may correspond to the antenna port 0, the second antenna port may correspond to the antenna port 1, the third antenna port may correspond to the antenna port 2, and the fourth antenna port may correspond to the antenna port 3. In this case, the first antenna port and the second antenna port form a group of SFBC codes, and the third antenna port and the fourth antenna port form another group of SFBC codes.

Certainly, the above is only an example, and a correspondence between the first antenna port to fourth antenna port and the antenna port 0 to the antenna port 3 may be in another form. Details are not described herein.

In this embodiment of this application, quantities of physical antennas to which the antenna ports are mapped are the same. Therefore, after determining the polarization direction of each of the P physical antennas and the antenna array to which each of the P physical antennas belongs, the network device may divide the P physical antennas into four groups of physical antennas, which are respectively the first group of physical antennas to the fourth group of physical antennas. The groups of physical antennas include a same quantity of physical antennas, and physical antennas in each group of physical antennas are in same polarization direction. Any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, a polarization direction of a physical antenna in the second group of physical antennas is the same as a polarization direction of a physical antenna in the fourth group of physical antennas, and a polarization direction of a physical antenna in the first group of physical antennas is different from a polarization direction of a physical antenna in the second group of physical antennas.

For example, P=8, and physical antennas supported by the network device are respectively a physical antenna 1, a physical antenna 2, a physical antenna 3, a physical antenna 4, a physical antenna 5, a physical antenna 6, a physical antenna 7, and a physical antenna 8. The network device determines that the physical antenna 1 and the physical antenna 2 belong to a same antenna array, the physical antenna 3 and the physical antenna 4 belong to a same antenna array, the physical antenna 5 and the physical antenna 6 belong to a same antenna array, and the physical antenna 7 and the physical antenna 8 belong to a same antenna array. In addition, the physical antenna 1, the physical antenna 3, the physical antenna 5, and the physical antenna 7 each are in the first polarization direction, and the physical antenna 2, the physical antenna 4, the physical antenna 6, and the physical antenna 8 each are in the second polarization direction. In this case, the first group of physical antennas may include the physical antenna 1 and the physical antenna 5, the second group of physical antennas may include the physical antenna 2 and the physical antenna 6, the third group of physical antennas may include the physical antenna 3 and the physical antenna 7, and the fourth group of physical antennas may include the physical antenna 4 and the physical antenna 8.

When the first antenna port corresponds to the antenna port 0, the second antenna port corresponds to the antenna port 1, the third antenna port corresponds to the antenna port 2, and the fourth antenna port corresponds to the antenna port 3, after determining the polarization direction of each of the P physical antennas and the antenna array to which each of the P physical antennas belongs, the network device may map the first antenna port to the first group of physical antennas in the P physical antennas, map the second antenna port to the second group of physical antennas in the P physical antennas, map the third antenna port to the third group of physical antennas in the P physical antennas, and map the fourth antenna port to the fourth group of physical antennas in the P physical antennas.

For example, with reference to FIG. 2, when an error occurs in a connection between a physical antenna and an RRU channel port, causing the RRU channel port B connecting to the physical antenna 1 and the RRU channel port C connecting to the physical antenna 2, the network device first determines that the physical antenna 0 and the physical antenna 1 belong to a same antenna array, and the physical antenna 2 and the physical antenna 3 belong to a same antenna array, and then may determine that polarization directions of the physical antenna 0 and the physical antenna 2 each are the first polarization direction, and polarization directions of the physical antenna 1 and the physical antenna 3 each are the second polarization direction. In this case, according to an optimal diversity gain criterion, when the network device configures the antenna ports, a configuration sequence is the antenna port 0, the antenna port 1, the antenna port 2, and the antenna port 3, so as to map the antenna port 0 to the physical antenna 1, map the antenna port 2 to the physical antenna 2, map the antenna port 1 to the RRU channel port A, and map the antenna port 3 to the physical antenna 4. For details, refer to FIG. 4.

Finally, the network device may send a signal by using the first antenna port to the fourth antenna port mapped to the physical antennas, for example, sending a cell-specific reference signal (CRS) by using the first antenna port to the fourth antenna port. Certainly, the network device may send another signal. Examples are not given one by one herein for illustration.

According to the method provided in this embodiment of this application, the network device determines the polarization direction of each of the P physical antennas and the antenna array to which each of the P physical antennas belongs, so as to map the first antenna port to the fourth antenna port to the P physical antennas in an optimal manner, thereby efficiently and accurately mapping the antenna port, and increasing a gain of a signal sent by using the antenna port.

Based on a same technical idea, an embodiment of this application further provides a network device. The network device may perform the method procedure shown in FIG. 3.

Figure 5:
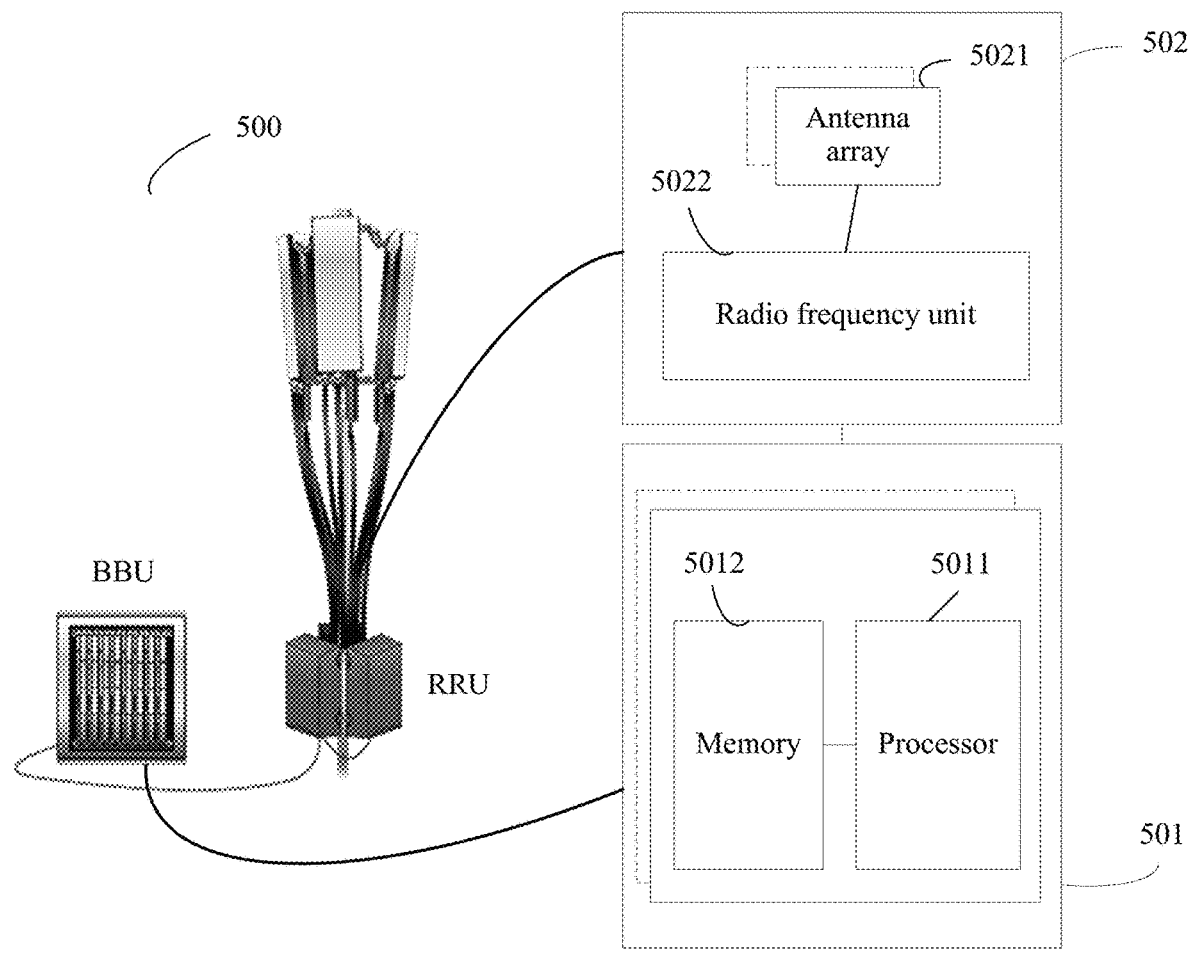
FIG. 5 is a schematic structural diagram of a network device according to an embodiment of this application.

FIG. 5 is a schematic structural diagram of a network device according to an embodiment of this application.

Referring to FIG. 5, the network device 500 includes a processor 5011 and a memory 5012.

The network device 500 may further include one or more remote radio units (RRU) 502 and one or more baseband units (BBU) 501. The RRU 502 may be referred to as a transceiver unit, a transceiver, a transceiver circuit, or the like, and may include at least one antenna array 5021 and a radio frequency unit 5022. The RRU 502 is mainly configured to transmit and receive a radio frequency signal and perform conversion between a radio frequency signal and a baseband signal. For example, the RRU 502 is configured to send an indication signal or a reference signal in the foregoing embodiment to a terminal.

The BBU 501 is mainly configured to perform baseband processing, control the network device, and the like. The RRU 502 and the BBU 501 may be physically disposed together, or may be physically separated, that is, constitute a distributed base station.

The BBU 501 is a control center of the network device, may be referred to as a processing unit, and is mainly configured to complete baseband processing functions, such as channel coding, multiplexing, modulation, spectrum spreading, and the like. In an example, the BBU 501 may include one or more boards. A plurality of boards may jointly support a radio access network (such as a 5G network) of a single access standard, or may separately support radio access networks of different access standards. The processor 5011 and the memory 5012 are located in the BBU 501.

The memory 5012 stores an executable instruction, and the processor 5011 reads the executable instruction in the memory 5012 to perform the following operations:

determining a polarization direction of each of P physical antennas of the network device and an antenna array to which each of the P physical antennas belongs, where P is a multiple of 4; and respectively mapping a first antenna port and a second antenna port to a first group of physical antennas and a second group of physical antennas in the P physical antennas, and respectively mapping a third antenna port and a fourth antenna port to a third group of physical antennas and a fourth group of physical antennas in the P physical antennas, where any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

In one embodiment, P is 4, the P physical antennas are divided into two antenna arrays, and each antenna array includes two physical antennas; and the processor 5011 is specifically configured to:

obtain K groups of signal quality measurement values, where K is 11 or 12; the K groups of signal quality measurement values are obtained by the network device by keeping a downtilt angle of one of the two antenna arrays unchanged while adjusting a downtilt angle of the other antenna array N times; and any group of the K groups of signal quality measurement values includes N signal quality measurement values, where the group of signal quality measurement values is determined by one of the P physical antennas based on received N signals sent by another physical antenna in the P physical antennas, and N is a positive integer greater than 1; and determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

In one embodiment, the signal quality measurement value is a signal to interference plus noise ratio SINR or reference signal received power RSRP.

In one embodiment, P is 4; and the processor 5011 is specifically configured to:

receive M uplink signals by using the P physical antennas, and determine P groups of signal receiving measurement values, where any group of the P groups of signal receiving measurement values includes M signal receiving measurement values of the M uplink signals received by one of the P physical antennas, and M is a positive integer greater than 1; and determine a coefficient of a correlation between every two groups of the P groups of signal receiving measurement values, determine two physical antennas, as physical antennas in a first polarization direction, corresponding to two groups of signal receiving measurement values corresponding to a largest correlation coefficient, and determine the other two physical antennas in the P physical antennas as physical antennas in a second polarization direction.

In one embodiment, the uplink signal is a demodulation reference signal DMRS or a sounding reference signal SRS.

Based on a same technical idea, an embodiment of this application further provides a network device. The network device may perform the method procedure shown in FIG. 3.

Figure 6:
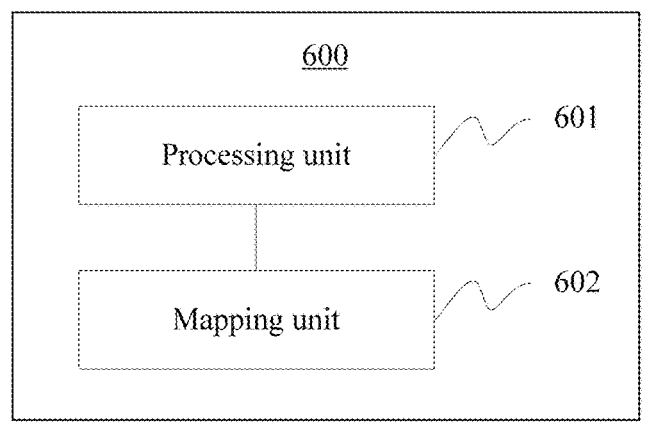
FIG. 6 is a schematic structural diagram of a network device according to an embodiment of this application

FIG. 6 is a schematic structural diagram of a network device according to an embodiment of this application.

Referring to FIG. 6, the network device 600 includes:

a processing unit 601, configured to determine a polarization direction of each of P physical antennas of the network device and an antenna array to which each of the P physical antennas belongs, where P is a multiple of 4; and a mapping unit 602, configured to: respectively map a first antenna port and a second antenna port to a first group of physical antennas and a second group of physical antennas in the P physical antennas, and respectively map a third antenna port and a fourth antenna port to a third group of physical antennas and a fourth group of physical antennas in the P physical antennas, where any physical antenna in the first group of physical antennas and a physical antenna in the second group of physical antennas belong to a same antenna array, any physical antenna in the third group of physical antennas and a physical antenna in the fourth group of physical antennas belong to a same antenna array, a polarization direction of a physical antenna in the first group of physical antennas is the same as a polarization direction of a physical antenna in the third group of physical antennas, and a polarization direction of a physical antenna in the second group of physical antennas is the same as a polarization direction of a physical antenna in the fourth group of physical antennas.

In one embodiment, P is 4, the P physical antennas are divided into two antenna arrays, and each antenna array includes two physical antennas; and the processing unit 601 is specifically configured to:

obtain K groups of signal quality measurement values, where K is 11 or 12; the K groups of signal quality measurement values are obtained by the network device by keeping a downtilt angle of one of the two antenna arrays unchanged while adjusting a downtilt angle of the other antenna array N times; and any group of the K groups of signal quality measurement values includes N signal quality measurement values, where the group of signal quality measurement values is determined by one of the P physical antennas based on received N signals sent by another physical antenna in the P physical antennas, and N is a positive integer greater than 1; and determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

In one embodiment, the signal quality measurement value is a signal to interference plus noise ratio SINR or reference signal received power RSRP.

In one embodiment, P is 4; and the processing unit 601 is specifically configured to:

receive M uplink signals by using the P physical antennas, and determine P groups of signal receiving measurement values, where any group of the P groups of signal receiving measurement values includes M signal receiving measurement values of the M uplink signals received by one of the P physical antennas, and M is a positive integer greater than 1; and determine a coefficient of a correlation between every two groups of the P groups of signal receiving measurement values, determine two physical antennas, as physical antennas in a first polarization direction, corresponding to two groups of signal receiving measurement values corresponding to a largest correlation coefficient, and determine the other two physical antennas in the P physical antennas as physical antennas in a second polarization direction.

In one embodiment, the uplink signal is a demodulation reference signal DMRS or a sounding reference signal SRS.

An embodiment of this application further provides a computer readable storage medium configured to store a computer software instruction that needs to be executed by the processor, and the computer software instruction includes a program that needs to be executed by the processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations provided that they fall within the scope of protection defined by the following claims.

What is claimed is:

1. An antenna port mapping method, comprising:
   determining, by a network device, a polarization direction of each physical antenna of P physical antennas of the network device and an antenna array to which each physical antenna of the P physical antennas belongs, wherein P is a multiple of 4; and
   mapping, by the network device, a first antenna port and a second antenna port to a first group of physical antennas and a second group of physical antennas in the P physical antennas respectively, and
   mapping a third antenna port and a fourth antenna port to a third group of physical antennas and a fourth group of physical antennas in the P physical antennas respectively, wherein a physical antenna in the first group of physical antennas and a physical antenna in the second group of physical antennas belong to a same antenna array, wherein a physical antenna in the third group of physical antennas and a physical antenna in the fourth group of physical antennas belong to a same antenna array, wherein a polarization direction of the physical antenna in the first group of physical antennas is the same as a polarization direction of the physical antenna in the third group of physical antennas, and wherein a polarization direction of the physical antenna in the second group of physical antennas is the same as a polarization direction of the physical antenna in the fourth group of physical antennas.

2. The method according to claim 1, wherein P is 4, wherein the P physical antennas are divided into two antenna arrays, and wherein each antenna array comprises two physical antennas; and wherein the determining, by the network device, the antenna array to which each physical antenna of the P physical antennas of the network device belongs comprises:
   obtaining, by the network device, K groups of signal quality measurement values, wherein K is 11 or 12; wherein the K groups of signal quality measurement values are obtained by the network device by keeping a downtilt angle of one of the two antenna arrays unchanged while adjusting a downtilt angle of the other antenna array N times, wherein each group of the K groups of signal quality measurement values comprises N signal quality measurement values, wherein each group of the K groups of signal quality measurement values is determined by one physical antenna of the P physical antennas based on N signals received from another physical antenna in the P physical antennas, and wherein N is a positive integer greater than 1.

3. The method according to claim 2, wherein the determining, by the network device, the antenna array to which each physical antenna of the P physical antennas of the network device belongs further comprises:
   determining, by the network device, a variance of each group of the K groups of signal quality measurement values, and
   determining that two physical antennas corresponding to a group of signal quality measurement values with a smallest variance in the K groups of signal quality measurement values belong to a same antenna array, and that the other two physical antennas in the P physical antennas belong to a same antenna array.

4. The method according to claim 2, wherein the signal quality measurement value is a signal to interference plus noise ratio (SINK) or reference signal received power (RSRP).

5. The method according to claim 1, wherein P is 4; and wherein the determining, by the network device, the polarization direction of each physical antennas of the P physical antennas of the network device comprises:
   receiving, by the network device, M uplink signals by using the P physical antennas, and
   determining P groups of signal receiving measurement values, wherein each group of the P groups of signal receiving measurement values comprises M signal receiving measurement values of the M uplink signals received by one of the P physical antennas, and wherein M is a positive integer greater than 1.

6. The method according to claim 5, wherein the determining, by the network device, the polarization direction of each physical antennas of the P physical antennas of the network device further comprises:
   determining, by the network device, a coefficient of a correlation between every two groups of the P groups of signal receiving measurement values,
   determining two physical antennas, as physical antennas in a first polarization direction, corresponding to two groups of signal receiving measurement values having a largest correlation coefficient, and
   determining the other two physical antennas in the P physical antennas as physical antennas in a second polarization direction.

7. The method according to claim 5, wherein the uplink signal is a demodulation reference signal (DMRS) or a sounding reference signal (SRS).

8. A network device, comprising a processor and a memory, wherein the memory stores executable instructions, and the processor reads the executable instructions in the memory to perform the following operations:
   determining a polarization direction of each physical antenna of P physical antennas of the network device and an antenna array to which each physical antenna of the P physical antennas belongs, wherein P is a multiple of 4; and mapping a first antenna port and a second antenna port to a first group of physical antennas and a second group of physical antennas in the P physical antennas respectively, and mapping a third antenna port and a fourth antenna port to a third group of physical antennas and a fourth group of physical antennas in the P physical antennas respectively, wherein a physical antenna in the first group of physical antennas and a physical antenna in the second group of physical antennas belong to a same antenna array, wherein a physical antenna in the third group of physical antennas and a physical antenna in the fourth group of physical antennas belong to a same antenna array, wherein a polarization direction of the physical antenna in the first group of physical antennas is the same as a polarization direction of the physical antenna in the third group of physical antennas, and wherein a polarization direction of the physical antenna in the second group of physical antennas is the same as a polarization direction of the physical antenna in the fourth group of physical antennas.

9. The network device according to claim 8, wherein P is 4, wherein the P physical antennas are divided into two antenna arrays, and wherein each antenna array comprises two physical antennas; and wherein the processor is further configured to:

obtain K groups of signal quality measurement values, wherein K is 11 or 12; wherein the K groups of signal quality measurement values are obtained by the network device by keeping a downtilt angle of one of the two antenna arrays unchanged while adjusting a downtilt angle of the other antenna array N, wherein each group of the K groups of signal quality measurement values comprises N signal quality measurement values, wherein each the group of the K groups of signal quality measurement values is determined by one of the P physical antennas based on signals N signals received from another physical antenna in the P physical antennas, and wherein N is a positive integer greater than 1.

10. The network device according to claim 9, wherein the processor is further configured to:

determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

11. The network device according to claim 9, wherein the signal quality measurement value is a signal to interference plus noise ratio (SINR) or reference signal received power (RSRP).

12. The network device according to claim 8, wherein P is 4, and wherein the processor is further configured to:

receive M uplink signals by using the P physical antennas, and determine P groups of signal receiving measurement values, wherein each group of the P groups of signal receiving measurement values comprises M signal receiving measurement values of the M uplink signals received by one of the P physical antennas, and M is a positive integer greater than 1.

13. The network device according to claim 12, wherein the processor is further configured to:

determine a coefficient of a correlation between every two groups of the P groups of signal receiving measurement values, determine two physical antennas, as physical antennas in a first polarization direction, corresponding to two groups of signal receiving measurement values having a largest correlation coefficient, and determine the other two physical antennas in the P physical antennas as physical antennas in a second polarization direction.

14. The network device according to claim 12, wherein the uplink signal is a demodulation reference signal (DMRS) or a sounding reference signal (SRS).

15. A non-transitory computer readable medium, configured to store program instructions, and when the computer software instructions are executed, cause a network device to:

determine a polarization direction of each physical antenna of P physical antennas of the network device and an antenna array to which each physical antenna of the P physical antennas belongs, wherein P is a multiple of 4; and map a first antenna port and a second antenna port to a first group of physical antennas and a second group of physical antennas in the P physical antennas respectively, and map a third antenna port and a fourth antenna port to a third group of physical antennas and a fourth group of physical antennas in the P physical antennas respectively, wherein a physical antenna in the first group of physical antennas and a physical antenna in the second group of physical antennas belong to a same antenna array, wherein a physical antenna in the third group of physical antennas and a physical antenna in the fourth group of physical antennas belong to a same antenna array, wherein a polarization direction of the physical antenna in the first group of physical antennas is the same as a polarization direction of the physical antenna in the third group of physical antennas, and wherein a polarization direction of the physical antenna in the second group of physical antennas is the same as a polarization direction of the physical antenna in the fourth group of physical antennas.

16. The non-transitory computer readable medium according to claim 15, wherein P is 4, wherein the P physical antennas are divided into two antenna arrays, and wherein each antenna array comprises two physical antennas; and wherein the non-transitory computer readable medium is further configured to cause the network device to obtain K groups of signal quality measurement values, wherein K is 11 or 12; wherein the K groups of signal quality measurement values are obtained by the network device by keeping a downtilt angle of one of the two antenna arrays unchanged while adjusting a downtilt angle of the other antenna array N times, wherein each group of the K groups of signal quality measurement values comprises N signal quality measurement values, wherein each group of the K groups of signal quality measurement values is determined by one of the P physical antennas based on N signals received from another physical antenna in the P physical antennas, and wherein N is a positive integer greater than 1.

17. The non-transitory computer readable medium according to claim 16, wherein the non-transitory computer readable medium is further configured to cause the network device to determine a variance of each group of the K groups of signal quality measurement values, and determine that two physical antennas corresponding to a group of signal quality measurement values with a smallest variance in the K groups of signal quality measurement values belong to a same antenna array, and that the other two physical antennas in the P physical antennas belong to a same antenna array.

18. The non-transitory computer readable medium according to claim 16, wherein the signal quality measurement value is a signal to interference plus noise ratio (SINR) or reference signal received power (RSRP).

19. The non-transitory computer readable medium according to claim 15, wherein P is 4; and wherein the non-transitory computer readable medium is further configured to cause the network device to receive M uplink signals by using the P physical antennas, determine groups of signal receiving measurement values, wherein each group of the P groups of signal receiving measurement values comprises M signal receiving measurement values of the M uplink signals received by one of the P physical antennas, and wherein M is a positive integer greater than 1, determine a coefficient of a correlation between every two groups of the P groups of signal receiving measurement values, determining two physical antennas, as physical antennas in a first polarization direction, corresponding to two groups of signal receiving measurement values having a largest correlation coefficient, and determine the other two physical antennas in the P physical antennas as physical antennas in a second polarization direction.

20. The non-transitory computer readable medium according to claim 19, wherein the uplink signal is a demodulation reference signal (DMRS) or a sounding reference signal (SRS).

* * * * *

UNITED STATES PATENT AND TRADEMARK OFFICE
CERTIFICATE OF CORRECTION

PATENT NO. : 11,109,261 B2  
APPLICATION NO. : 16/698690  
DATED : August 31, 2021  
INVENTOR(S) : Xiaolong Zhu et al.

Page 1 of 1

It is certified that error appears in the above-identified patent and that said Letters Patent is hereby corrected as shown below:

In the Claims

In Claim 4, Column 20, Line 27, delete "(SINK)" and insert --(SINR)--.

In Claim 9, Column 21, Line 34, delete "N, wherein" and insert --N times, wherein--.

In Claim 9, Column 21, Line 37, delete "each the group" and insert --each group--.

In Claim 9, Column 21, Line 39, delete "signals N signals" and insert --N signals--.

In Claim 19, Column 24, Line 2, delete "determine groups" and insert --determine P groups--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*